US012565319B2

(12) United States Patent
Hoover et al.

(10) Patent No.: US 12,565,319 B2
(45) Date of Patent: Mar. 3, 2026

(54) PILOT SEAT ARMREST ASSEMBLY WITH SYNCHRONOUS LIFT AND TILT ADJUSTMENT

(71) Applicant: AMI Industries, Inc., Colorado Springs, CO (US)

(72) Inventors: Douglas E. Hoover, Colorado Springs, CO (US); Nicholas DeCola, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 245 days.

(21) Appl. No.: 18/429,959

(22) Filed: Feb. 1, 2024

(65) Prior Publication Data

US 2025/0250009 A1     Aug. 7, 2025

(51) Int. Cl.
B64D 11/06 (2006.01)

(52) U.S. Cl.
CPC ...... B64D 11/0644 (2014.12); B64D 11/0689 (2013.01)

(58) Field of Classification Search
CPC ............ B64D 11/0644; B64D 11/0689; B60N 2/767; B60N 2/77
See application file for complete search history.

(56) References Cited

U.S. PATENT DOCUMENTS

| | | | |
|---|---|---|---|
| 2,043,626 A | 6/1936 | Morrison | |
| 4,239,282 A | 12/1980 | White | |
| 5,433,509 A | 7/1995 | Hotary et al. | |
| 5,823,624 A | 10/1998 | Dahlbacka | |
| 7,341,313 B2 | 3/2008 | Bedford et al. | |
| 11,459,109 B2 | 10/2022 | Hoover et al. | |

*Primary Examiner* — Nicholas McFall
*Assistant Examiner* — Eric Acosta
(74) *Attorney, Agent, or Firm* — Suiter Swantz IP

(57) ABSTRACT

An adjustable armrest assembly for a seat such as a pilot seat. In embodiments, the armrest assembly includes an armrest frame, a leadscrew rotatably mounted in the armrest frame, a control wheel mounted to the leadscrew, an armpad subassembly pivotally attached to the armrest frame, and a tilt link subassembly coupled between the armrest frame and the armpad subassembly. In use, rotating the leadscrew synchronizes rotational motion of the armrest frame relative to the seat, and armpad subassembly motion relative to the armrest frame. In embodiments, the adjustment capability of the armrest assembly facilitates use with a flight controller positioned forward of the armrest.

20 Claims, 11 Drawing Sheets

PILOT SEAT ARMREST ASSEMBLY WITH SYNCHRONOUS LIFT AND TILT ADJUSTMENT

TECHNICAL FIELD AND BACKGROUND

The present disclosure relates generally to an adjustable armrest, and more particularly, to a pilot seat armrest assembly including a single controller for synchronous lift and tilt adjustment.

Various types of seats include armrests for comfort and support. Regarding pilot seats, to which the present disclosure finds particular application, traditional armrests include complicated mechanisms for adjusting the armrests relative to cockpit flight controllers. In use, pilot seat armrests are required to support the forearm while using the flight controllers. Due to differently sized pilots, there is a need for armrests that are adjustable both vertically (e.g., up/down) and angularly (e.g., fore/aft tilt) to achieve proper alignment with the flight controllers. Traditional armrests include separate controllers for operating separate mechanisms for performing the different adjustments. Separate controllers and mechanisms are complicated to operate, costly to produce, heavy, and unreliable.

Therefore, there is a need for an adjustable armrest assembly that overcomes the disadvantages of traditional pilot seat armrests.

BRIEF SUMMARY

According to one aspect, the inventive concepts according to the present disclosure are directed to an adjustable armrest assembly. In embodiments, the armrest assembly includes an armrest frame for pivotal attachment to a seat frame member, a leadscrew rotatably mounted in the armrest frame, a control wheel mounted to the leadscrew, an armpad subassembly pivotally attached to the armrest frame, the armpad subassembly including at least one inclined slot, and a tilt link subassembly having a first end mounted on the leadscrew and a second end engaged in and configured to travel along the at least one inclined slot. In embodiments, the leadscrew, the tilt link, and the at least one inclined slot are arranged such that, in use, rotating the leadscrew in a first direction causes the armrest frame to pivot upward and the armpad subassembly to pivot away from the armrest frame, and rotating the leadscrew in a second direction, opposite the first direction, causes the armrest frame to pivot downward and the armpad subassembly to pivot toward the armrest frame.

In some embodiments, the aft end of the leadscrew extends to a position outside of the aft end of the armrest frame to bear against a bearing surface positioned on the seat frame member to control angular rotation of the armrest frame as the leadscrew is translated linearly.

In some embodiments, the tilt link subassembly includes at least one tilt link, a bearing axle mounted to the at least one tilt link, and at least one roller bearing mounted on the bearing axle.

In some embodiments, the armpad subassembly includes a first armpad frame member forming a first inclined slot, a second armpad frame member forming a second inclined slot, the second armpad frame member attachable to the first armpad frame member, and an armpad mounted atop the first and second armpad frame members.

In some embodiments, the armpad has a convex shape.

In some embodiments, the armrest frame and the armpad subassembly are pivotally attached at their respective forward ends.

In some embodiments, the armrest frame includes a bottom cavity, the leadscrew is threadably engaged in the armrest frame for linear translation relative to the armrest frame, and the control wheel is rotatably fixed to the leadscrew and positioned in the cavity for linear translation back and forth within the cavity.

In some embodiments, the arrangement of the leadscrew, the tilt link, and the at least one inclined slot synchronizes pivoting motion of the armrest frame relative to the seat frame member, and pivoting motion of the armpad subassembly relative to the armrest frame.

According to another aspect, the inventive concepts according to the present disclosure are directed to a pilot seat assembly including left and right seat frame members each including an armrest hub, a seat back and a seat bottom positioned between the left and right seat frame members, and an armrest assembly rotatably attached to each of the left and the right seat frame members. In embodiments, the armrest assembly includes an armrest frame rotatably mounted to its respective armrest hub, a leadscrew rotatably mounted in the armrest frame, a control wheel mounted to the leadscrew, an armpad subassembly pivotally attached to the armrest frame, and a tilt link subassembly mounted on the leadscrew and configured to interact with an inclined slot formed in the armpad subassembly.

According to a further aspect, the inventive concepts according to the present disclosure are directed to a pilot seat configuration including a pilot seat including left and right seat frame members each including an armrest hub, an armrest assembly rotatably attached to each of the left and the right seat frame members, and a flight controller positioned forward of one of the armrest assemblies.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
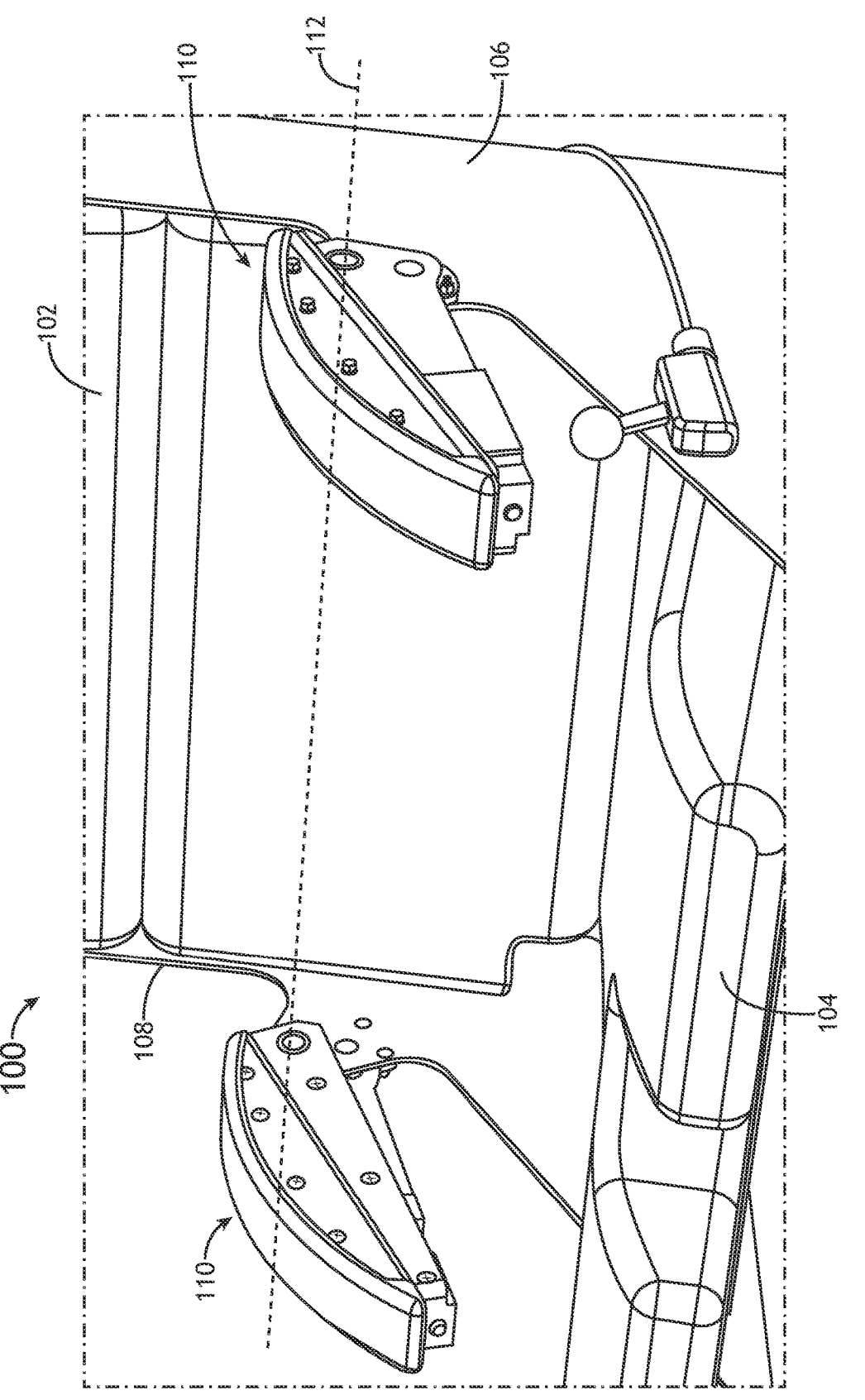
FIG. 1 is a perspective view of a pilot seat equipped with armrest assemblies, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an adjustable armrest assembly for a seat such as a pilot seat. In embodiments, the pilot seat is equipped with two armrest assemblies (e.g., a left armrest assembly and a right armrest assembly). In use, the armrest assemblies are independently adjustable for positioning a support portion of the armrest assemblies relative to a separate object such as a flight controller. In use, the armrest assemblies are adjustable to support a forearm of a pilot seat relative to a flight controller to accommodate differently sized pilots. In use, each armrest assembly is configured to rotate between a stowed position in which the armrest assembly is positioned substantially upright, and a deployed position in which the armrest assembly is positioned substantially horizontal, to facilitate seat ingress and egress. The terms 'pivot', 'pivoting' and 'pivotably' may be used synonymously and interchangeably herein with the terms 'rotate', 'rotating' and 'rotatably', respectively.

FIG. 1 illustrates a non-limiting example of a pilot seat assembly 100 generally including a seat back 102 and a seat bottom 104 positioned between left and right spaced frame members 106, 108. As shown, the pilot seat assembly 100 includes left and right armrest assemblies 110. In embodiments, the left and right armrest assemblies 110 may be the same in terms of componentry, but may be configured as mirror opposites considering their position on the left and right sides of the pilot seat assembly 100 and for aesthetics. FIG. 1 shows both armrest assemblies 110 rotated downward to their deployed positions for supporting, for example, the forearms of a pilot. Each armrest assembly 110 is configured to rotate about a rotation axis 112. FIG. 1 further shows both armrest assemblies 110 in their fully 'lowered' and 'collapsed' configuration as discussed below.

Figure 2:
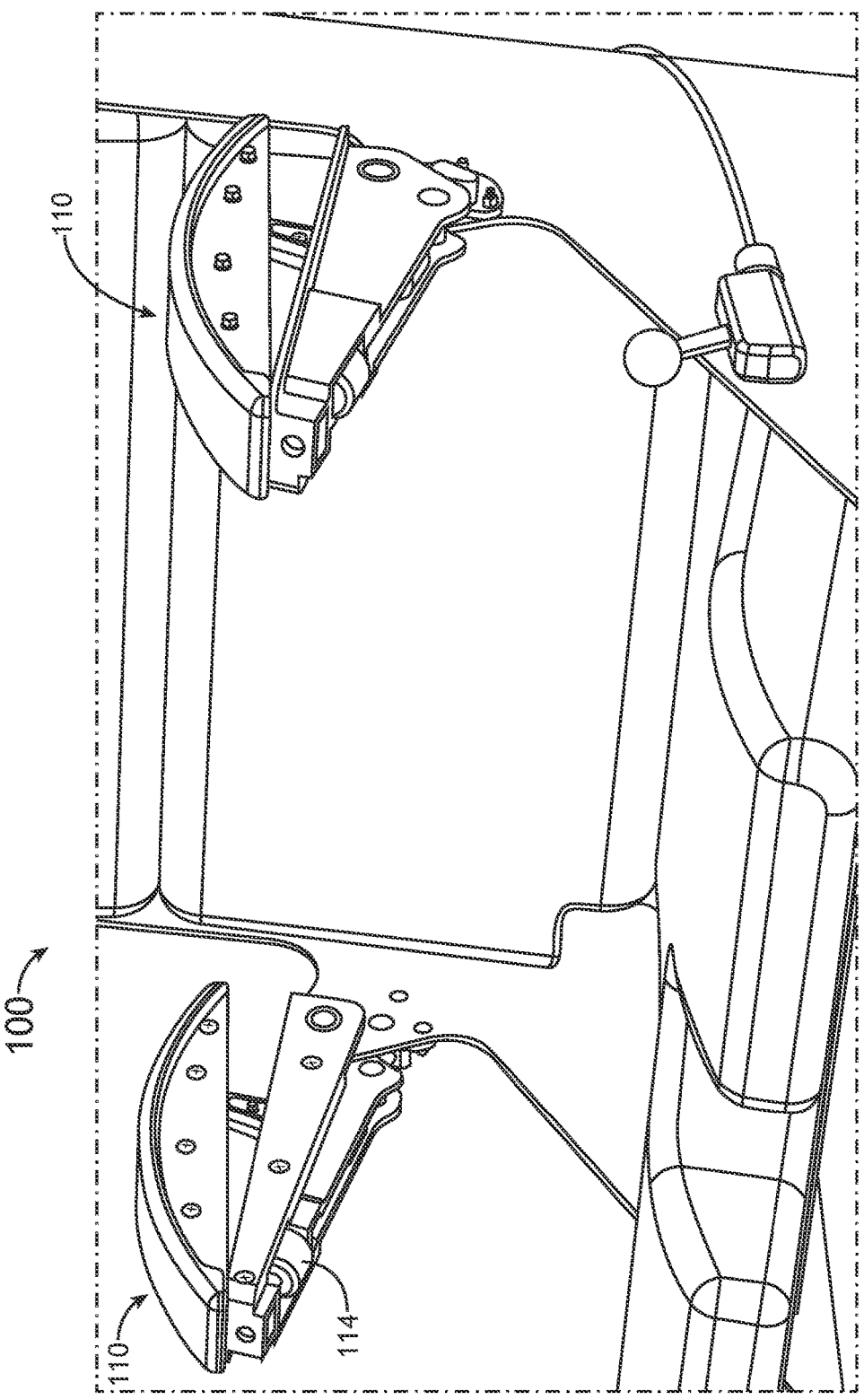
FIG. 2 is a perspective view of the pilot seat showing the armrest assemblies adjusted up and tilted, in accordance with example embodiments of this disclosure.

FIG. 2 illustrates both armrest assemblies 110 in their deployed position for use, and with both armrest assemblies 110 in their fully 'raised' and 'expanded' configuration as discussed below. Each armrest assembly 110 is independently rotatable between a stowed position and a deployed position, and is independently adjustable between fully 'lowered' and 'collapsed', and fully 'raised' and 'expanded', through a plurality of intermediate positions. As discussed below, pivoting motion of the armrest and pivoting motion of the armpad are synchronized such that as the armrest rotates upward, the armpad rotates apart from the armrest, and vice versa. The armrest assembly 110 is adjustable via a synchronizing mechanism operated by turning, by hand, a control wheel 114 presented on the bottom of the armrest assembly 110. By positioning the control wheel 114 on the bottom of the armrest assembly 110, the pilot can use his or her thumb to manipulate the control wheel 114, and unintentional contact with the control wheel 114 can be avoided.

Figure 3:
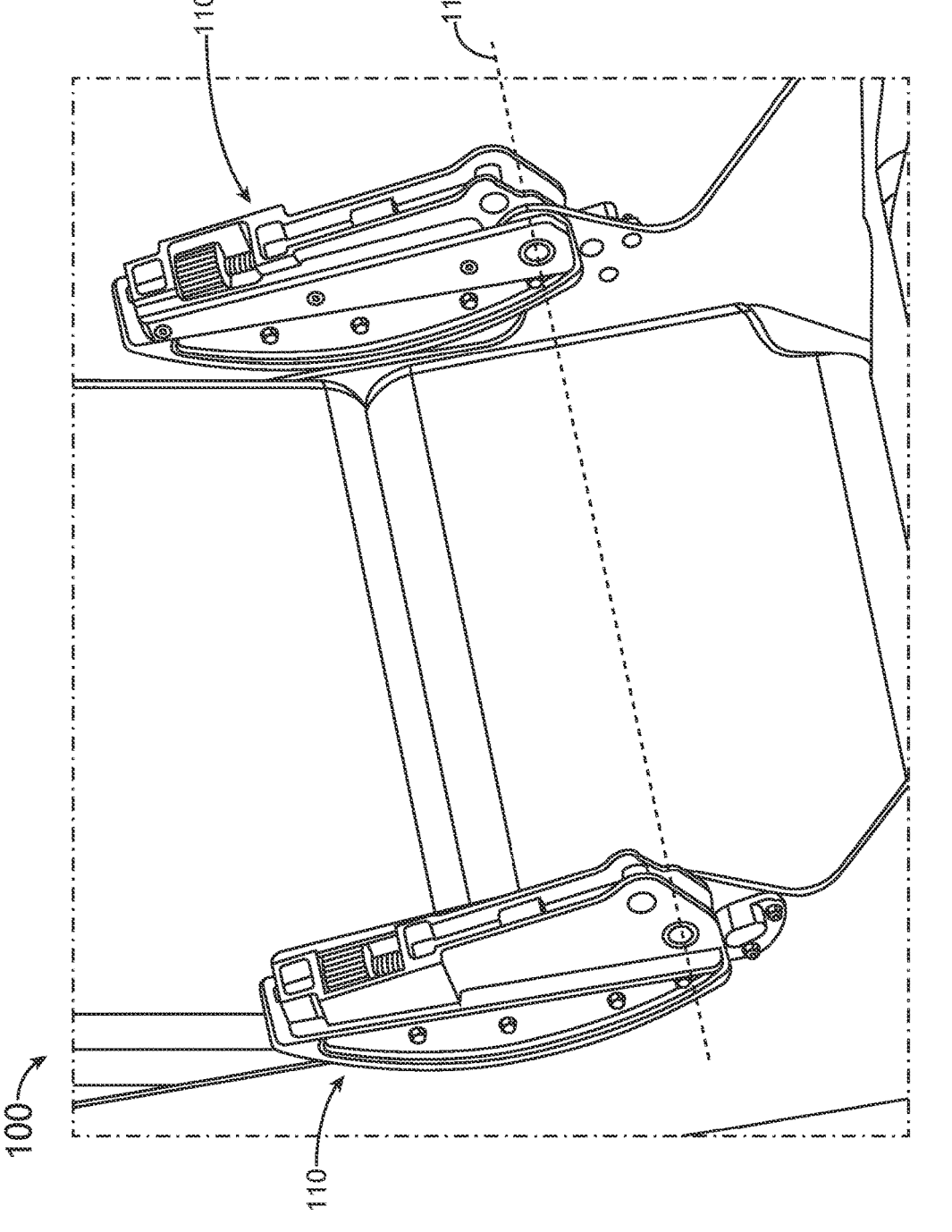
FIG. 3 is a perspective of the pilot seat showing the armrest assemblies rotated upward to a stowed position, in accordance with example embodiments of this disclosure.

FIG. 3 illustrates both armrest assemblies 110 rotated upward to their stowed positions to facilitate seat ingress and egress. Each armrest assembly 110 rotates, independently and manipulated by hand, about its rotation axis 112. When fully stowed, each armrest assembly 110 is positioned substantially upright (e.g., at or near vertical). When fully deployed, each armrest assembly 110 is positioned substantially horizontal.

Figures 4A, 4B:
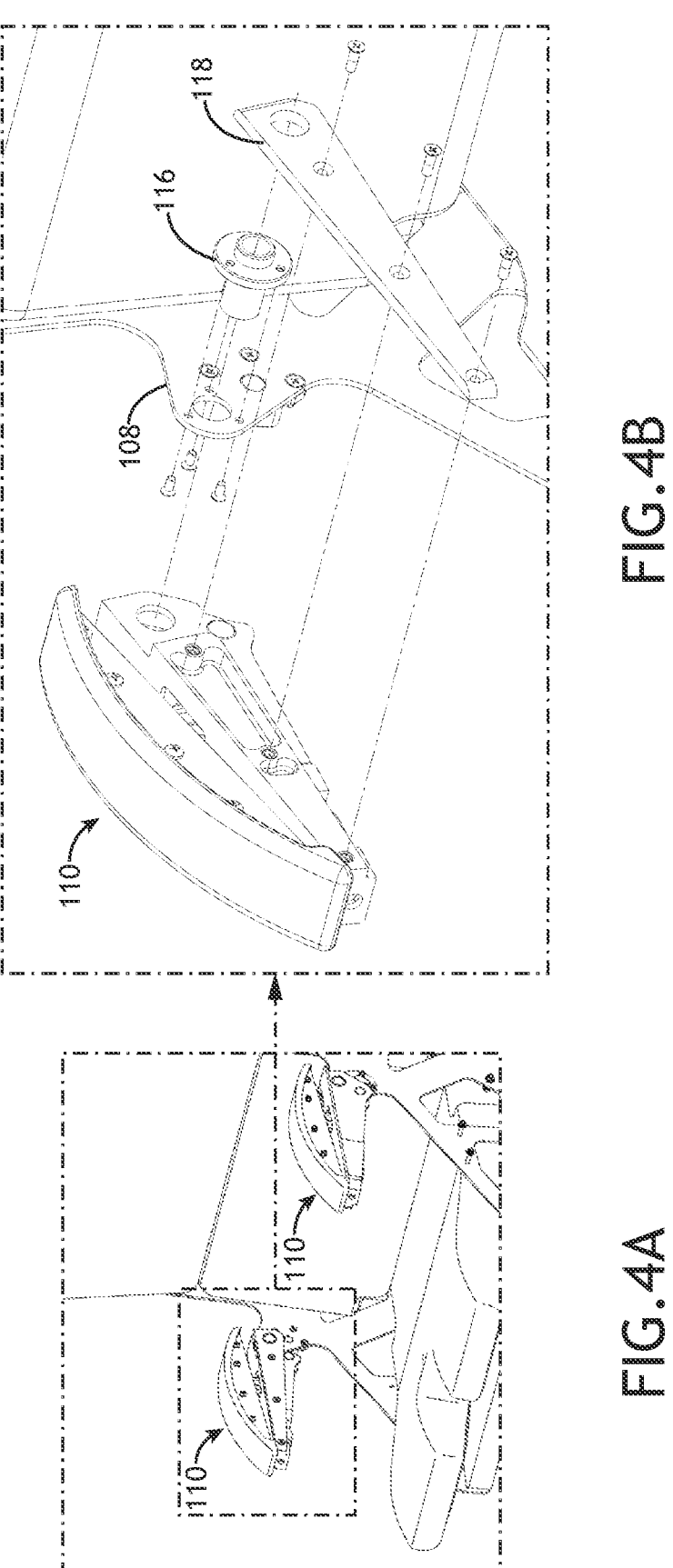
FIG. 4A is a perspective view of a pilot seat equipped with armrest assemblies, in accordance with example embodiments of this disclosure.
FIG. 4B is an exploded view of FIG. 4A showing the components associated with the armrest assembly attachment to the pilot seat, in accordance with example embodiments of this disclosure.

FIG. 4A illustrates each armrest assembly 110 in an intermediate configuration between fully lowered and fully raised. FIG. 4B illustrates how the armrest assembly 110 attaches to the seat such as a pilot seat. As shown, a hole formed through the respective seat frame member 108 is configured to receive an armrest hub 116 that defines the rotation axis. The armrest hub 116 is mounted to the seat frame member 108, for instance using fasteners. The armrest hub 116 extends laterally beyond the seat frame member 108 and the armrest assembly 110 is rotatably mounted on the armrest hub 116. In some embodiments, an armrest closeout bracket 118 rotatably mounts on the other end of the armrest hub 116 (e.g., on the interior side) and attaches to the armrest assembly 110, for instance using fasteners.

Figure 5:
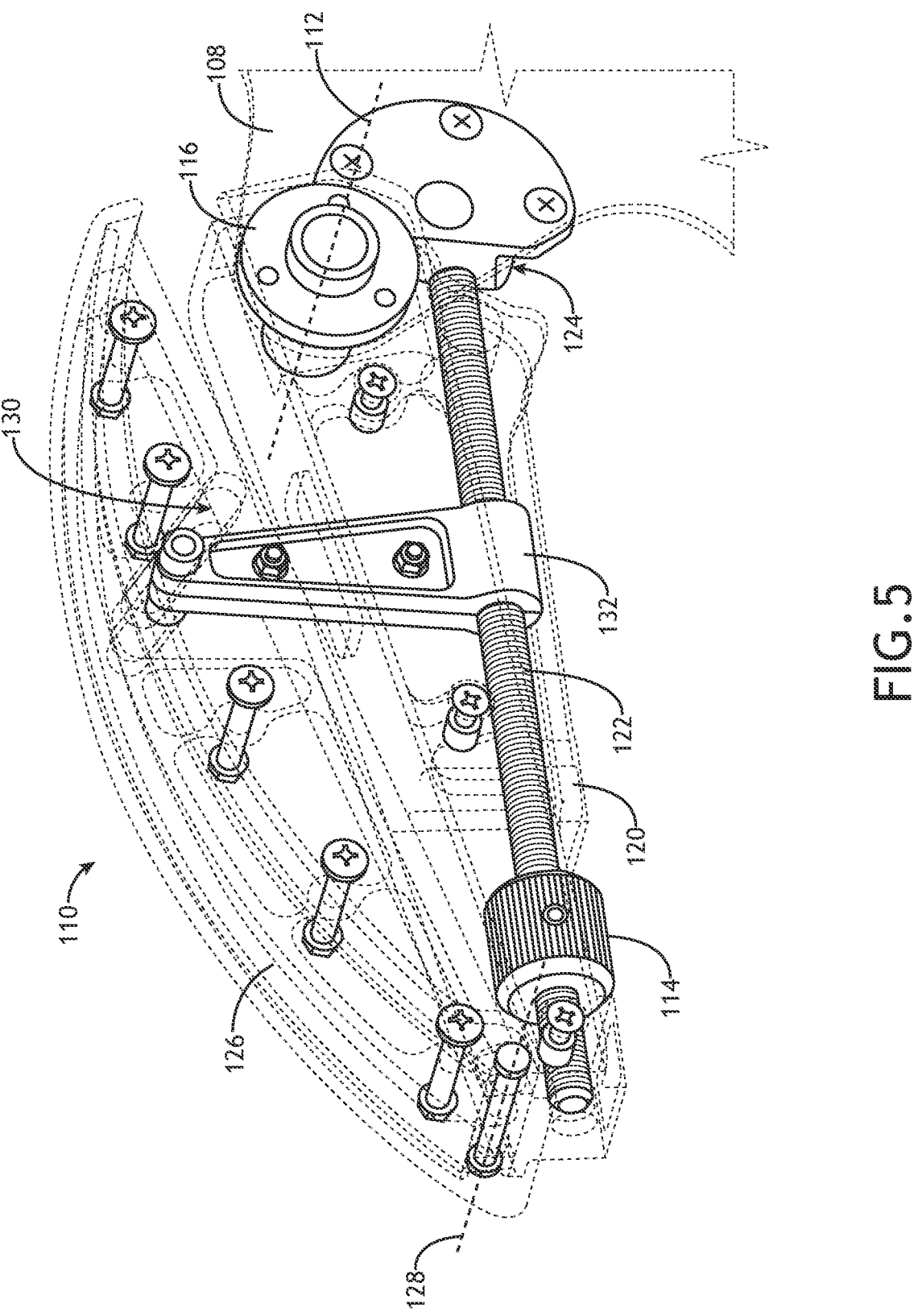
FIG. 5 is an isometric view of the armrest assembly, in accordance with example embodiments of this disclosure.

FIG. 5 illustrates one of the armrest assemblies 110. In embodiments, the armrest assembly 110 includes an armrest frame 120 configured to be rotatably mounted to the armrest hub 116 associated with the pilot seat. A leadscrew 122 is rotatably mounted in the armrest frame 120. In embodiments, the leadscrew 122 is externally threaded along at least a portion of its length, and features of the armrest frame 120 are internally threaded to threadably engage the leadscrew 122. The control wheel 114 is mounted to the leadscrew 122 and united therewith such that rotating the control wheel 114 causes the leadscrew 122 to rotate, and the threaded engagement, thereby causing the leadscrew to translate forward or aft relative to the armrest frame 120. The forward end of the leadscrew 122 may extend outside of the forward end of the armrest frame 120 is some positions of the armrest assembly 110. The aft end of the leadscrew 122 extends to a position outside of the aft end of the armrest frame 120 and bears against a bearing surface 124 positioned on the seat frame member 108, for instance on a formed bearing surface or separate component mounted to the seat frame member 108.

The armrest assembly 110 further includes an armpad subassembly 126 pivotally attached to the armrest frame 120. In embodiments, the armpad subassembly 126 is pivotally attached at its forward end to a forward end of the armrest frame 120. In this configuration, the rotation axis 112 of the armrest frame 120 is positioned proximal to the aft end of the armrest frame 120, and the rotation axis 128 the armpad subassembly 126 is positioned proximal to the forward end of the armrest frame 120. The armpad subassembly 126 includes at least one inclined slot 130, inclined in a direction of the forward end of the armrest assembly 110. A tilt link subassembly 132, attached at one end to the leadscrew 122, is engaged at its opposing end in the at least one inclined slot 130. In use, the tilt link subassembly 132 converts linear translation of the leadscrew 122 into rotational motion of the armpad subassembly 126 through the interaction of the second (e.g., upper) end of the tilt link subassembly 132 with the inclined slot 130.

Figure 6:
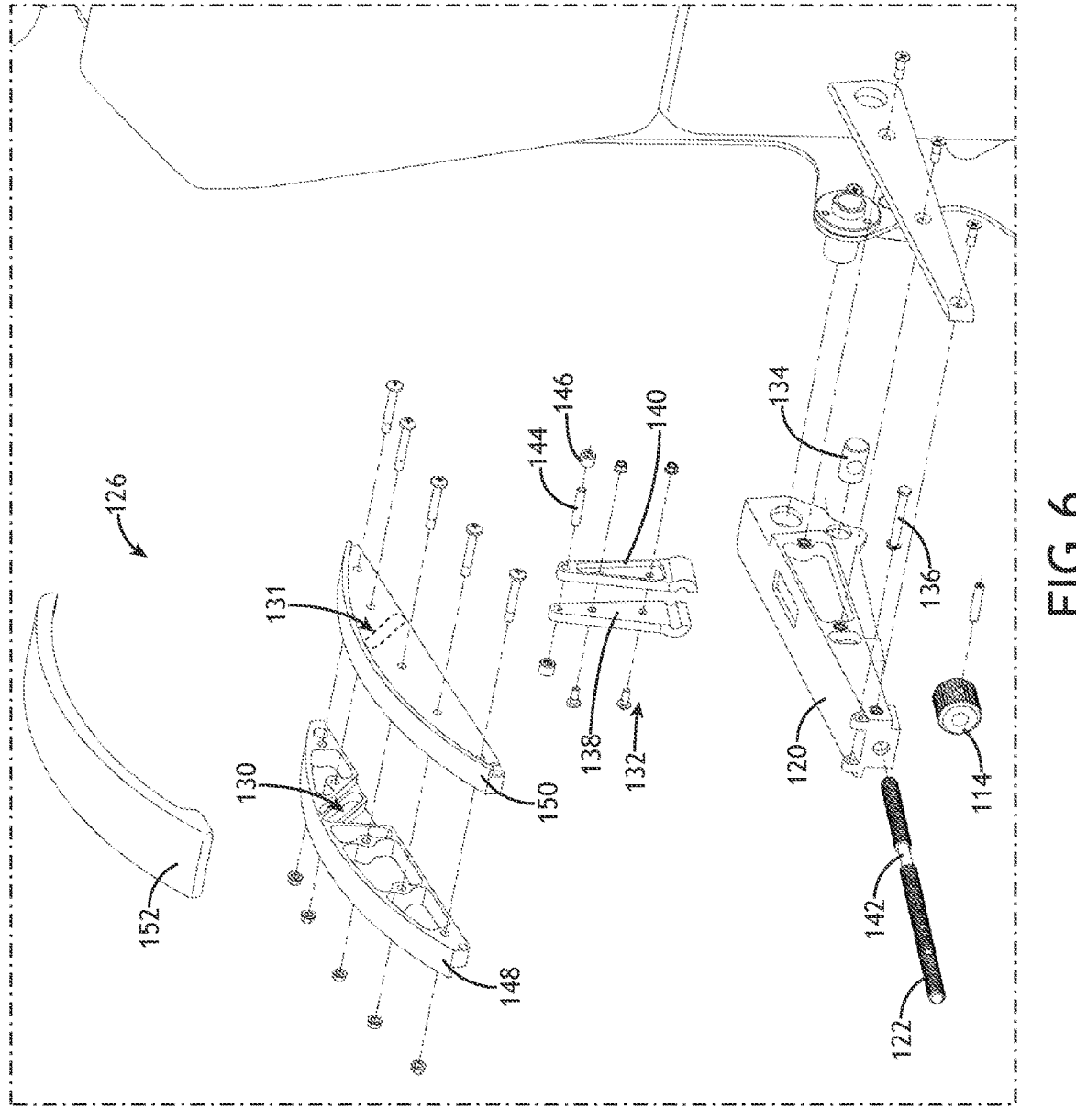
FIG. 6 is an exploded view of the armrest assembly shown in FIG. 5.

FIG. 6 is an exploded view of the armrest subassembly 110 illustrating the components thereof. In embodiments, the leadscrew 122 is received through the front end of the of the armrest frame 120 and through the control wheel 114, and the control wheel is rotationally fixed to the leadscrew such that rotating the control wheel 114 causes the leadscrew 122 to rotate. A barrel nut 134 may be received in the armrest frame 120 configured to receive the aft end of the leadscrew 122 therethrough. A pivot pin 136 is received through the armrest frame 120 and the armpad subassembly 126 and defines the rotation axis of the armpad subassembly 126. In embodiments, the tilt link subassembly 132 includes a first tilt link 138 and a second tilt link 140 attachable to the first tilt link 138, for instance using fasteners. The mated tilt link ends capture the leadscrew 122 around an unthreaded portion 142 of the leadscrew 122 such that leadscrew linear motion causes tilt link subassembly linear motion and therefore movement along the at least one inclined slot 130. The tilt link subassembly 132 further includes a bearing axle 144 mounted to the upper ends of the tilt links 138, 140 in the case of two attached tilt links, and at least one vertically oriented roller bearing 146 mounted on the bearing axle 144. As shown, two roller bearings 146 are mounted on opposite ends of the bearing axle 144 with each roller bearing 146 received in one of the inclined slots 130 as discussed below. In some embodiments, a bearing may be provided at the mating interface between the tilts links 138, 140 and the unthreaded portion 142 of the leadscrew 122 to provided a low-friction rotational interface.

In embodiments, the armpad subassembly 126 includes a first armpad frame member 148 forming a first inclined slot 130, a second armpad frame member 150 forming a second inclined slot 131, the second armpad frame member attachable to the first armpad frame member 148 for instance using fasteners, and an armpad 152 mounted atop the first and second attached armpad frame members 148, 150. In some embodiments, the armpad 152 has a convex shape as shown. In a configuration including two roller bearings 146 and two inclined slots 130, each roller bearing 146 is configured to roll against its respective slot 130 to cause the armpad subassembly 126 to pivot as the leadscrew 122 translates linearly.

Figure 7A:
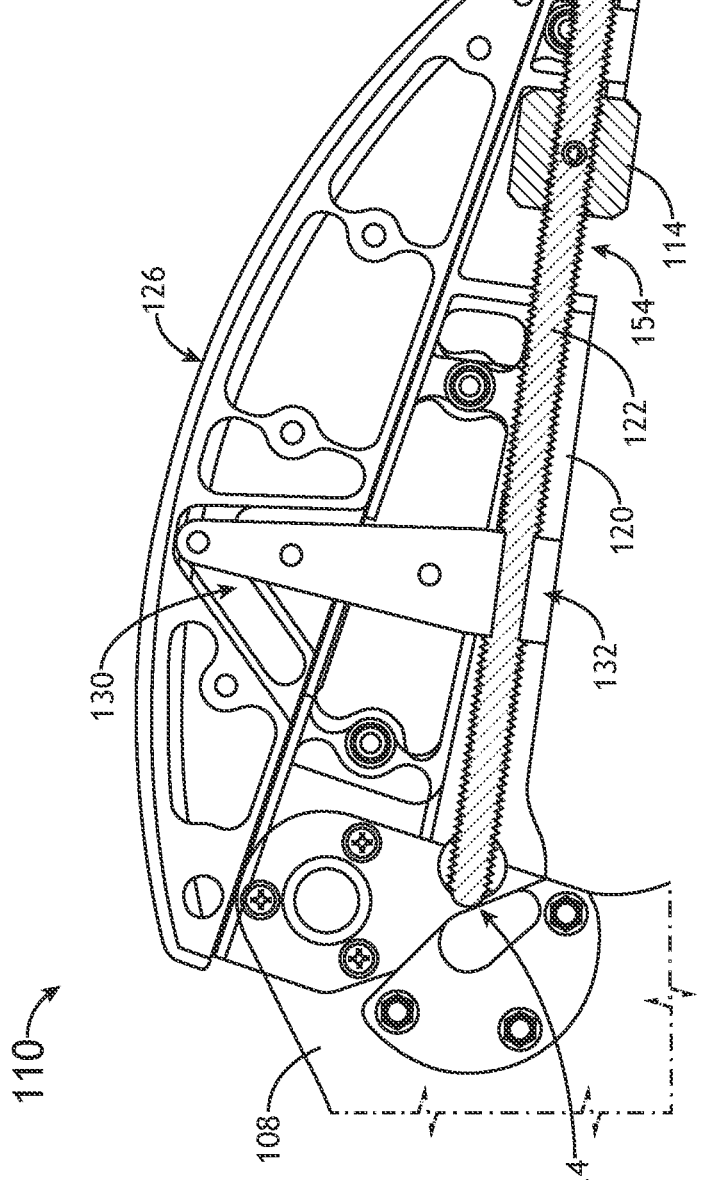
FIG. 7A is a sectional view of the armrest assembly shown adjusted to a fully lowered position, in accordance with example embodiments of this disclosure.

FIGS. 7A-7D illustrate various armrest assembly 110 positions. FIG. 7A illustrates the fully 'lowered' and 'collapsed' configuration of the armrest assembly 110 wherein the lower limiter/stop to the armrest assembly 110 is provided by the control wheel 114 in contact with the armrest frame 120. In embodiments, the armrest frame 120 includes a bottom cavity 154, the control wheel 114 is positioned in the bottom cavity 154 for linear translation, and the two ends of the bottom cavity 154 correspond to the fully lowered and fully raised positions of the armrest frame 120. As show, when fully 'lowered', the control wheel 114 is positioned at, and in contact with, the forward end of the bottom cavity 154, and the leadscrew 122 is forwardmost such that the upper end of the tilt link subassembly 132 is positioned at the upper end of the inclined slot 130 for positioning the armpad subassembly 126 contracted against the armrest frame 120.

Figure 7B:
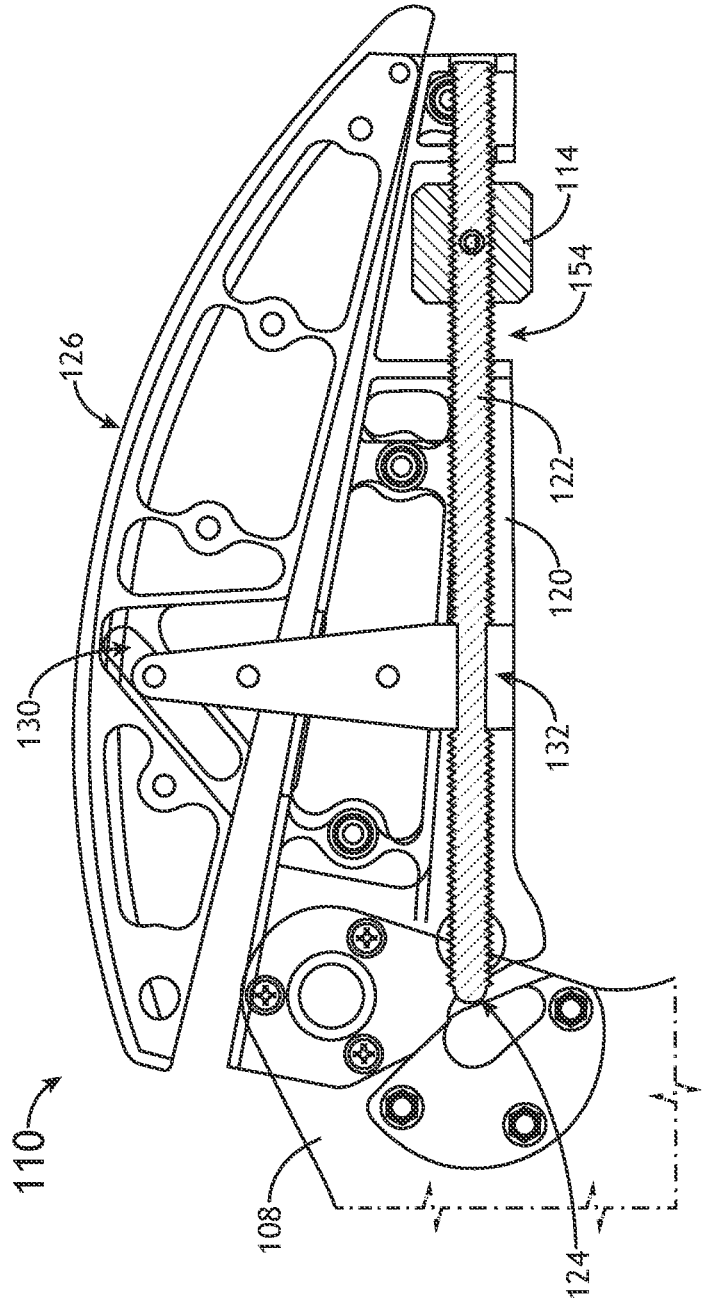
FIG. 7B is a sectional view of the armrest assembly shown adjusted to a first intermediate position, in accordance with example embodiments of this disclosure.

FIG. 7B illustrates an intermediate position of the armrest assembly 110. To achieve this position, the leadscrew 122 has been linearly translated aft to bear against the bearing surface 124 to determine the angle of the armrest frame 120, which because the armrest frame rotation motion and the armpad subassembly rotation motion are synchronized by the interaction of the tilt link subassembly 132 and the inclined or ramped slot 130, the armpad subassembly 126 has been caused to rotate away from the armrest frame 120 to change the tilt of the armpad subassembly 126. As shown, the control wheel 114 is positioned between the two ends of the bottom cavity 154 nearer the forward end.

7

Figure 7C:
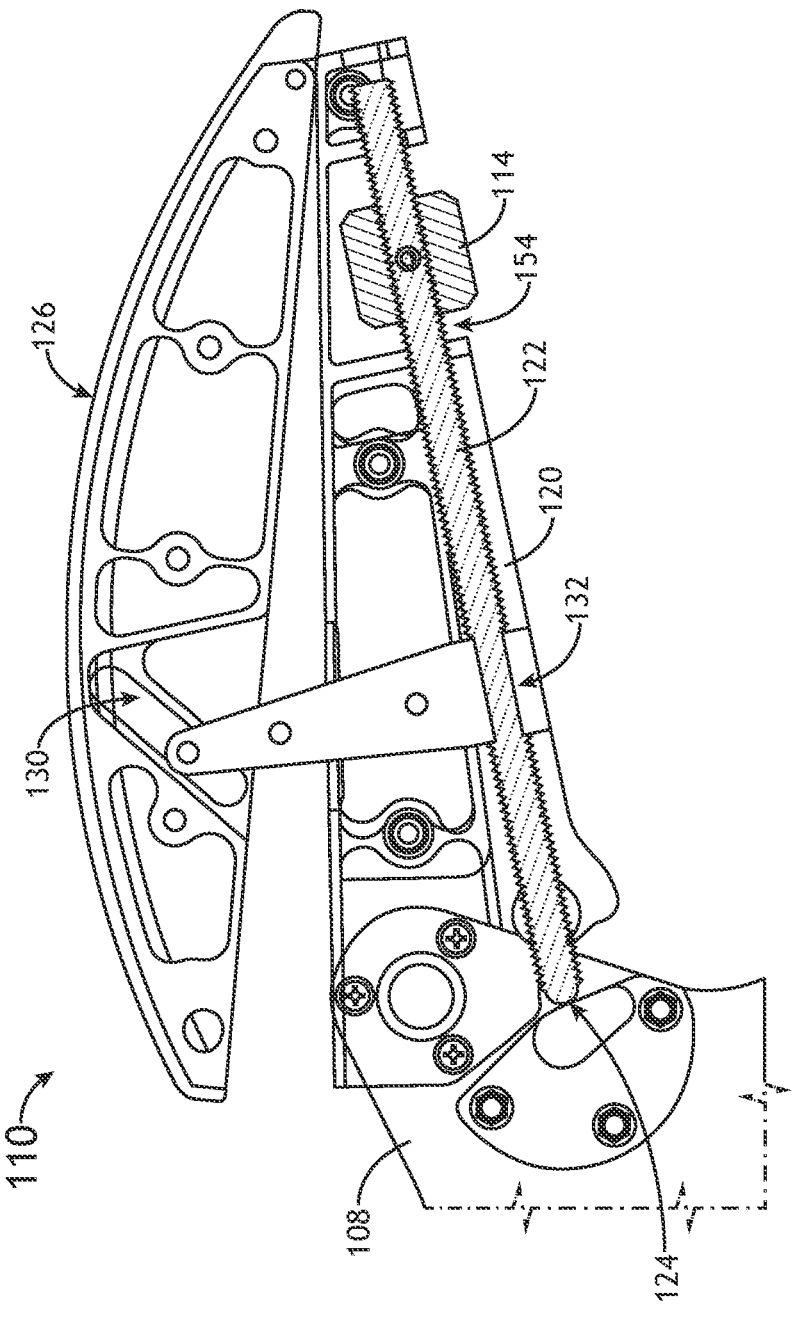
FIG. 7C is a sectional view of the armrest assembly shown adjusted to a second intermediate position, in accordance with example embodiments of this disclosure.

FIG. 7C illustrates a further intermediate position of the armrest assembly 110. To achieve this position, the leadscrew 122 has been linearly translated further aft to bear against the bearing surface 124 to determine the angle of the armrest frame 120 (e.g., raise), which because the armrest frame rotation motion and the armpad subassembly rotation motion are synchronized by the interaction of the tilt link subassembly 132 and the inclined or ramped slot 130, the armpad subassembly 126 has been caused to rotate further away from the armrest frame 120 to change the tilt of the armpad subassembly 126. As shown, the control wheel 114 is positioned between the two ends of the bottom cavity 154 nearer the aft end as compared to the control wheel position shown in FIG. 7B.

Figure 7D:
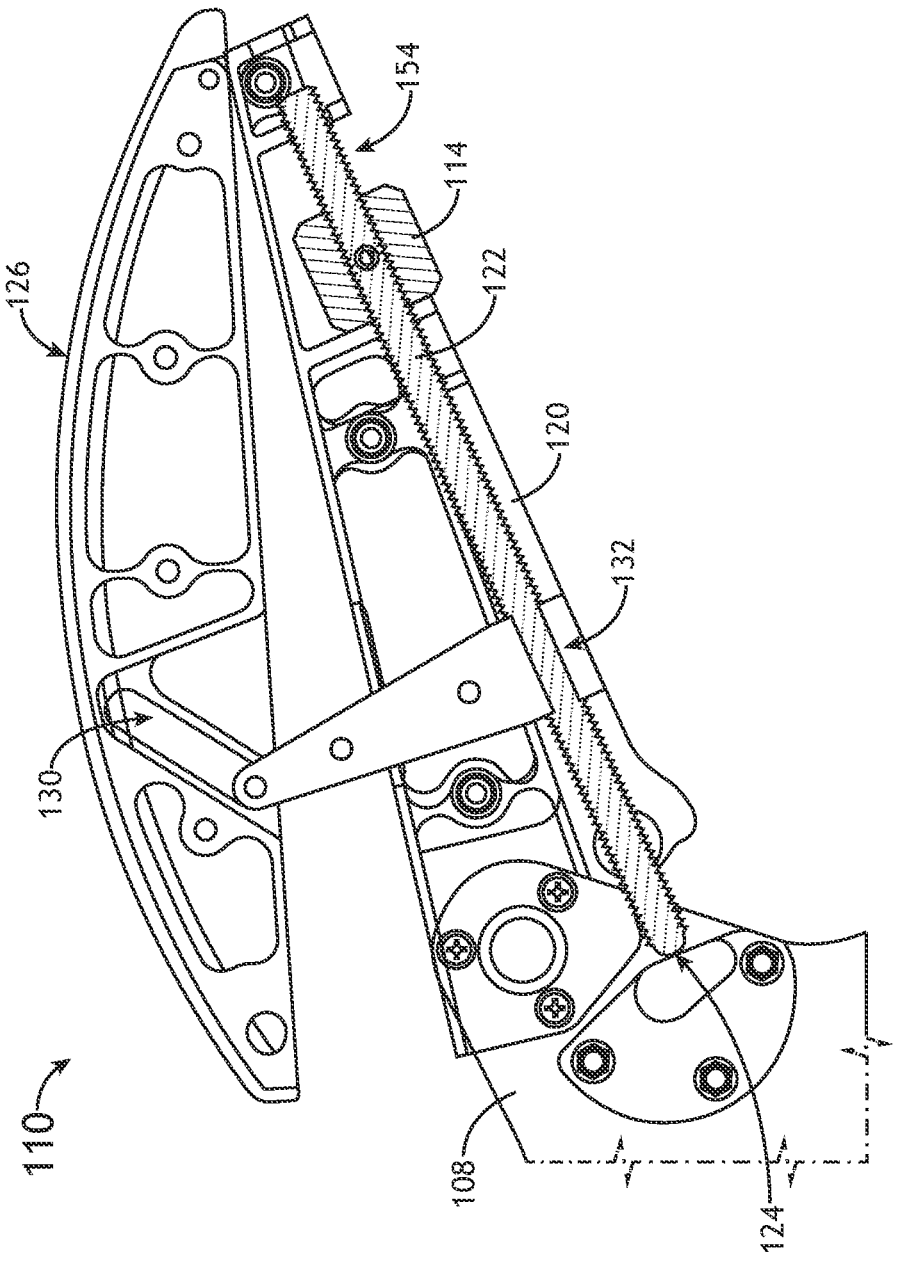
FIG. 7D is a sectional view of the armrest assembly shown adjusted to a fully raised position, in accordance with example embodiments of this disclosure.

FIG. 7D illustrates the fully 'raised' and 'expanded' configuration of the armrest assembly 110. In this configuration, the leadscrew 122 is translated farthest aft and limited by engagement of the control wheel 114 against the aft end of the bottom cavity 154. The synchronous motion of the two rotations causes the tilt link subassembly 132 to be driven to the bottom end of the at least one slot 130 thereby driving the armpad subassembly farthest apart from the armrest frame 120. The threaded engagement of the leadscrew 122 and the armrest frame 120 provides selective adjustment for fine tuning between the fully 'raised' and the fully 'lowered' configurations. The range of motion may be tuned by adjusting one of more of the threading, length of the bottom cavity 154, width of the control wheel 114, length of the tilt link subassembly 132, inclination and/or length of the at least one inclined slot 130, and the interface of the leadscrew 122 and the bearing surface 124. Considering the threaded engagement, the relative component positions are maintained until the next adjustment is made.

Figures 8A, 8B, 8C:
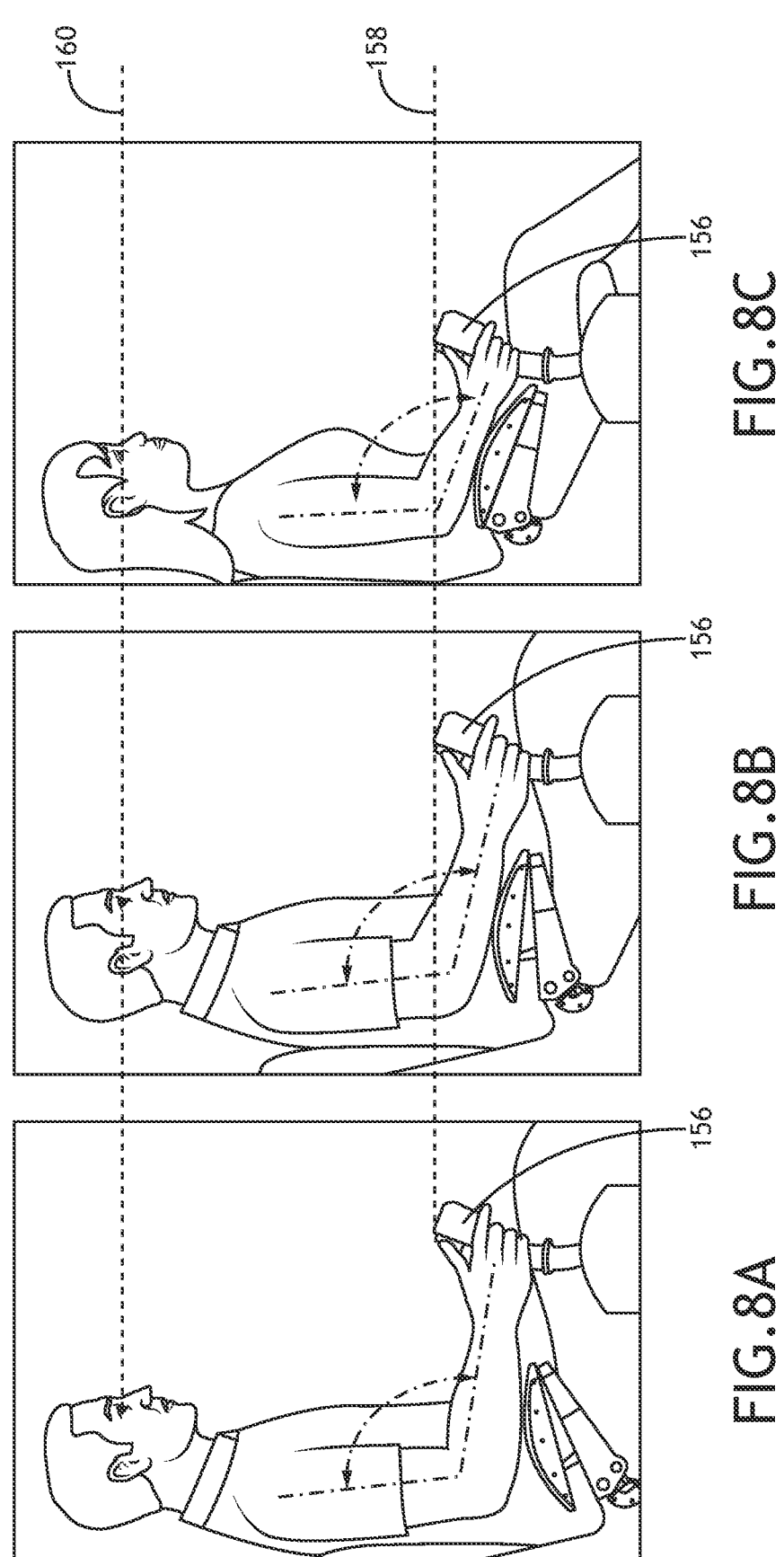
FIGS. 8A-C are side views showing different armrest positions for differently sized pilots and in relation to flight controllers, in accordance with example embodiments of this disclosure.

FIGS. 8A-8C illustrate differently sized pilots and benefits of the adjustable armrest assemblies according to the present disclosure for positioning the pilot relative to a flight controller 156 positioned at a static flight controller height 158. Reference number 160 indicates the typical eyeline for each of the differently sized pilots shown. FIG. 8A depicts a large (e.g., 95$^{th}$ percentile) pilot requiring the most armrest lift and tilt. FIG. 8B depicts a medium (e.g., 50$^{th}$ percentile) pilot requiring medium armrest lift and tilt. FIG. 8C depicts a small (e.g., 5$^{th}$ percentile) pilot requiring the least amount of armrest lift and tilt. In some pilot seat and flight controller configurations, a large pilot may need to sit low and more aft in the pilot seat, and so to obtain the proper line of action and support for the forearm relative to the static flight controller 156, the armpad would be tilted upward as the armrest lift is adjusted upward. In some pilot seat and flight controller configurations, a medium sized pilot may sit at a neutral position and therefore the armpad would be tilted less due to the armrest not being tilted up as far. In some pilot seat and flight controller configurations, a smaller sized pilot may sit high and more forward in the pilot seat and therefore the armpad tilt may be at its lowest position and the armrest set to no tilt. The curvature (e.g., convex curvature) of the armpad allows for good forearm support regardless of where the forearm contacts the armpad.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An armrest assembly, comprising:
an armrest frame for pivotal attachment to a seat frame member;
a leadscrew rotatably mounted in the armrest frame;
a control wheel mounted to the leadscrew;
an armpad subassembly pivotally attached to the armrest frame, the armpad subassembly including at least one inclined slot; and
a tilt link subassembly having a first end mounted on the leadscrew and a second end engaged in and configured to travel along the at least one inclined slot;
wherein the leadscrew, the tilt link, and the at least one inclined slot are arranged such that, in use:
rotating the leadscrew in a first direction causes the armrest frame to pivot upward and the armpad subassembly to pivot away from the armrest frame; and
rotating the leadscrew in a second direction, opposite the first direction, causes the armrest frame to pivot downward and the armpad subassembly to pivot toward the armrest frame.

2. The armrest assembly according to claim 1, wherein an aft end of the leadscrew extends to a position outside of the aft end of the armrest frame to bear against a bearing surface positioned on the seat frame member to control angular rotation of the armrest frame.

3. The armrest assembly according to claim 1, wherein the tilt link subassembly comprises:
at least one tilt link;
a bearing axle mounted to the at least one tilt link; and
at least one roller bearing mounted on the bearing axle.

4. The armrest assembly according to claim 1, wherein the armpad subassembly comprises:
a first armpad frame member forming a first inclined slot;
a second armpad frame member forming a second inclined slot, the second armpad frame member attachable to the first armpad frame member; and
an armpad mounted atop the first and second armpad frame members.

5. The armrest assembly according to claim 4, wherein the armpad has a convex shape.

6. The armrest assembly according to claim 1, wherein the armrest frame and the armpad subassembly are pivotally attached at their respective forward ends.

7. The armrest assembly according to claim 1, wherein:
the armrest frame includes a bottom cavity;
the leadscrew is threadably engaged in the armrest frame for linear translation; and
the control wheel is rotatably fixed to the leadscrew and positioned in the cavity for linear translation.

8. The armrest assembly according to claim 1, wherein the arrangement of the leadscrew, the tilt link, and the at least one inclined slot synchronizes pivoting motion of the armrest frame relative to the seat frame member, and pivoting motion of the armpad subassembly relative to the armrest frame.

9. A pilot seat assembly, comprising:
left and right seat frame members each including an armrest hub;
a seat back and a seat bottom positioned between the left and right seat frame members; and
an armrest assembly rotatably attached to each of the left and the right seat frame members, the armrest assembly comprising:

an armrest frame rotatably mounted to its respective armrest hub;

a leadscrew rotatably mounted in the armrest frame;

a control wheel mounted to the leadscrew;

an armpad subassembly pivotally attached to the armrest frame, the armpad subassembly including at least one inclined slot; and a tilt link subassembly having a first end mounted on the leadscrew and a second end engaged in and configured to travel along the at least one inclined slot;

wherein the leadscrew, the tilt link, and the at least one inclined slot are arranged such that, in use:

rotating the leadscrew in a first direction causes the armrest frame to pivot upward and the armpad subassembly to pivot away from the armrest frame; and rotating the leadscrew in a second direction, opposite the first direction, causes the armrest frame to pivot downward and the armpad subassembly to pivot toward the armrest frame.

10. The pilot seat assembly according to claim 9, wherein an aft end of the leadscrew extends to a position outside of the aft end of the armrest frame and bears against a bearing surface positioned on the respective seat frame member to control angular rotation of the armrest frame.

11. The pilot seat assembly according to claim 9, wherein the tilt link subassembly comprises:

a first tilt link;

a second tilt link attached the first tilt link, the leadscrew captured between the first and second tilt links;

a bearing axle mounted to the first and second tilt links; and first and second roller bearings mounted on opposite ends of the bearing axle.

12. The pilot seat assembly according to claim 9, wherein the armpad subassembly comprises:

a first armpad frame member forming a first inclined slot;

a second armpad frame member forming a second inclined slot, the second armpad frame member attachable to the first armpad frame member; and an armpad mounted atop the first and second armpad frame members.

13. The pilot seat assembly according to claim 12, wherein the armpad has a convex shape.

14. The pilot seat assembly according to claim 9, wherein:

the armrest frame and the armpad subassembly are pivotally attached at their respective forward ends; and the armrest frame is pivotally at its aft end to the respective seat frame member.

15. The pilot seat assembly according to claim 9, wherein:

the armrest frame includes a bottom cavity;

the leadscrew is threadably engaged in the armrest frame for linear translation; and the control wheel is rotatably fixed to the leadscrew and positioned in the cavity for linear translation.

16. The pilot seat assembly according to claim 9, wherein the arrangement of the leadscrew, the tilt link, and the at least one inclined slot synchronizes pivoting motion of the armrest frame relative to the respective seat frame member, and pivoting motion of the armpad subassembly relative to the armrest frame.

17. A pilot seat configuration, comprising:

a pilot seat including left and right seat frame members each including an armrest hub;

an armrest assembly rotatably attached to each of the left and the right seat frame members, the armrest assembly comprising:

an armrest frame rotatably mounted to its respective armrest hub;

a leadscrew rotatably mounted in the armrest frame;

a control wheel mounted to the leadscrew;

an armpad subassembly pivotally attached to the armrest frame, the armpad subassembly including at least one inclined slot; and a tilt link subassembly coupled to the leadscrew and engaged in the at least one inclined slot; and a flight controller positioned forward of one of the armrest assemblies.

18. The pilot seat configuration according to claim 17, wherein, in use:

rotating the leadscrew in a first direction causes the tilt link subassembly to travel in a first direction thereby causing the armrest frame to pivot upward and the armpad subassembly to pivot away from the armrest frame; and rotating the leadscrew in a second direction, opposite the first direction, causes the tilt link assembly to travel in a second direction, opposite the first direction, thereby causing the armrest frame to pivot downward and the armpad subassembly to pivot toward the armrest frame.

19. The pilot seat configuration according to claim 17, wherein an aft end of the leadscrew extends to a position outside of the aft end of the armrest frame and bears against a bearing surface positioned on the respective seat frame member to control angular rotation of the armrest frame.

20. The pilot seat configuration according to claim 17, wherein:

the armrest frame includes a bottom cavity;

the leadscrew is threadably engaged in the armrest frame for linear translation; and the control wheel is rotatably fixed to the leadscrew and positioned in the cavity for linear translation.

* * * * *